US006112610A

United States Patent [19]
Welling

[11] Patent Number: 6,112,610
[45] Date of Patent: *Sep. 5, 2000

[54] EXTERNALLY INSERTABLE SELF-RETAINING CROSSOVER FOR BALL NUT AND SCREW ASSEMBLIES

[75] Inventor: William E. Welling, Saginaw, Mich.

[73] Assignee: Thomson Saginaw Ball Screw Company, LLC, Saginaw, Mich.

[*] Notice: This patent is subject to a terminal disclaimer.

[21] Appl. No.: 09/103,407

[22] Filed: Jun. 24, 1998

Related U.S. Application Data

[60] Provisional application No. 60/054,761, Aug. 5, 1997.

[51] Int. Cl.[7] .................................................. F16H 25/22
[52] U.S. Cl. ...................... 74/459; 74/89.15; 74/424.8 R
[58] Field of Search ................................... 74/459, 89.15, 74/424.8 R

[56] References Cited

U.S. PATENT DOCUMENTS

| | | |
|---|---|---|
| 3,580,098 | 5/1971 | Good . |
| 3,815,435 | 6/1974 | Eshenbacher et al. . |
| 3,961,541 | 6/1976 | Fund et al. . |
| 4,887,480 | 12/1989 | Pollo .................................. 74/459 |
| 4,905,534 | 3/1990 | Andonegui . |
| 5,193,409 | 3/1993 | Babinski . |
| 5,555,770 | 9/1996 | Dolata et al. ......................... 74/459 |
| 5,622,082 | 4/1997 | Machelski . |
| 5,711,188 | 1/1998 | Miyaguchi et al. . |

FOREIGN PATENT DOCUMENTS

| | | |
|---|---|---|
| 0103316 | of 1984 | European Pat. Off. . |
| 2703122-A1 | of 1994 | France . |
| 2355844 | 6/1974 | Germany ................................ 74/459 |
| 486283 | 11/1953 | Italy ....................................... 74/459 |
| 5-1414497 | 6/1993 | Japan .................................... 74/459 |

*Primary Examiner*—David A. Bucci
*Assistant Examiner*—William C Joyce
*Attorney, Agent, or Firm*—Reising, Ethington, Barnes, Kisselle, Learman & McCulloch, P.C.

[57] ABSTRACT

A ball nut and screw system provides a helical raceway for load bearing balls disposed to occupy portions of the turns of the helical groove in the nut. The nut has a passage extending generally radially from its exterior surface to its interior to permit the balls to be fed into a ball-occupied portion of the turns. A snap-in crossover button inserted into the nut passage has an axially diagonal ball return channel in its underface for channeling the balls from one portion of one of the adjacent turns over an intervening land surface on the screw to a portion of another turn to recirculate them. The nut passage and snap-in button comprise a laterally compressible system with passage recesses and snap-in button projections received in the recesses which is operable automatically upon insertion of the button to a predetermined position to locate the button radially in a position in which the crossover channel aligns helically with the turns.

11 Claims, 2 Drawing Sheets

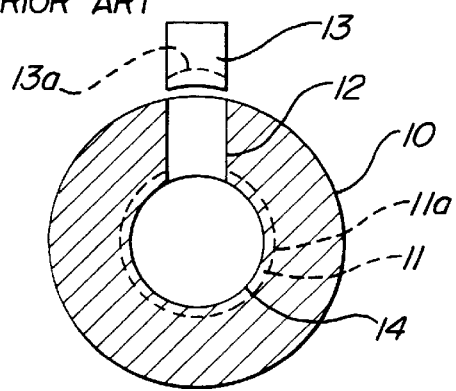
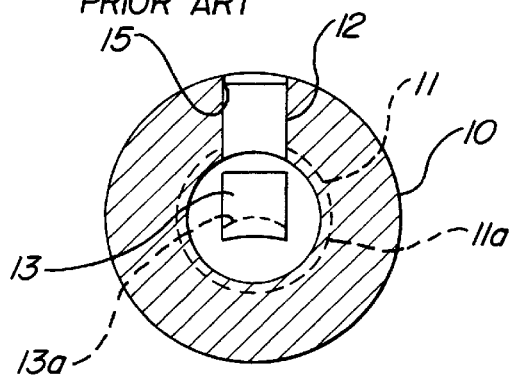
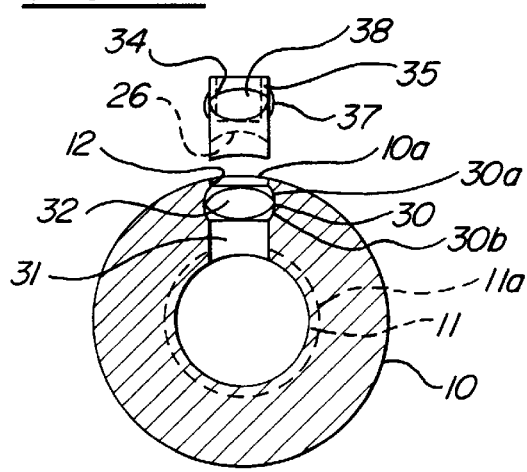
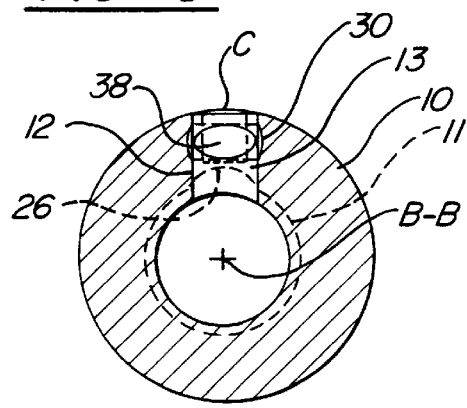
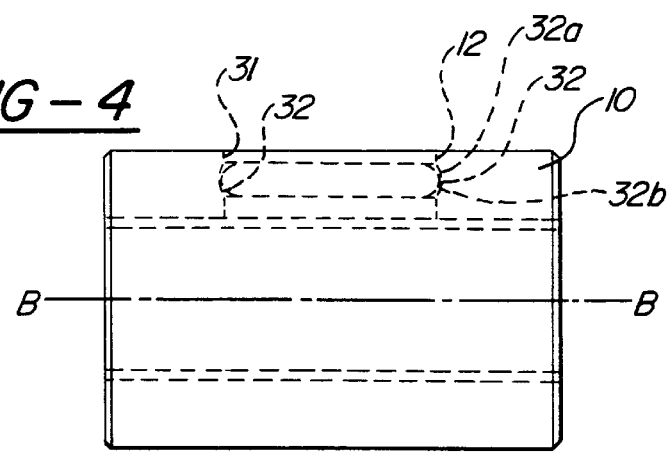

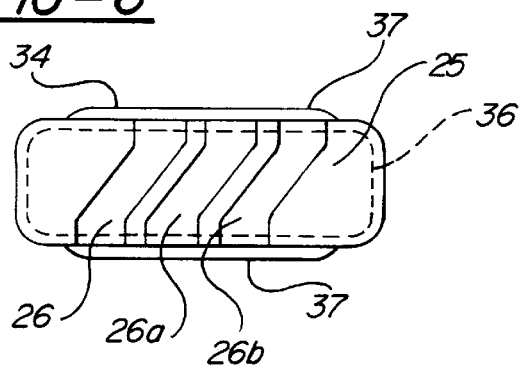
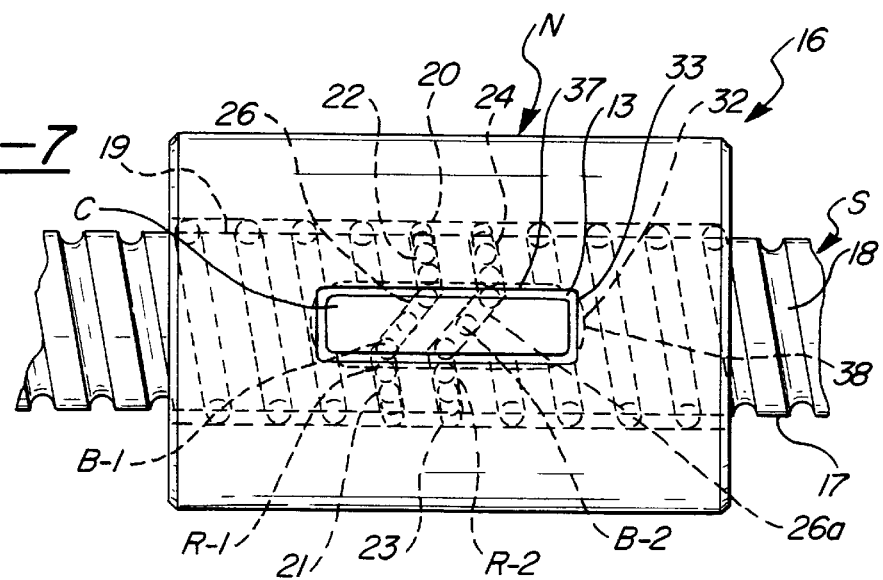
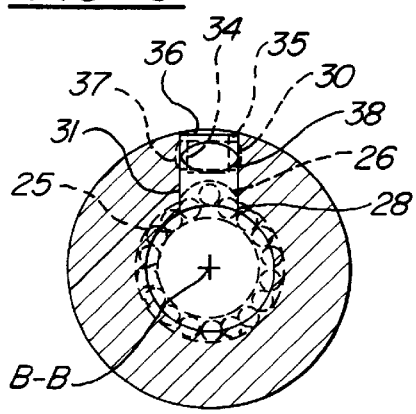
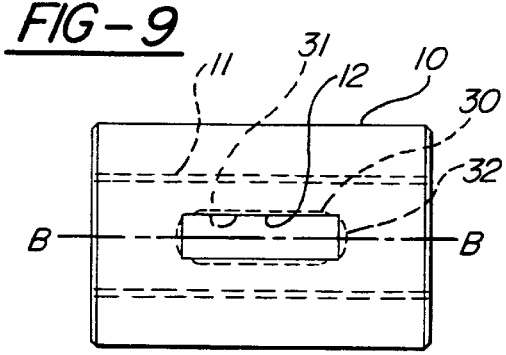

EXTERNALLY INSERTABLE SELF-RETAINING CROSSOVER FOR BALL NUT AND SCREW ASSEMBLIES

This application claims the benefit of U.S. provisional No. 60/054,761 filed Aug. 5, 1997.

The present invention relates to ball screw mechanisms wherein complemental helical grooves are formed in a nut and screw to provide a raceway for a train of abutting load bearing balls. These mechanisms are used widely in many fields to provide axial movement with only rolling friction between the screw and nut members. In such mechanisms, buttons or blocks are utilized in cutouts provided in the barrel of the nut to return the balls to adjacent turns of the raceway.

A crossover button having a body with an axially diagonal, raceway turn bridging, ball crossover recirculation passage in its radially inner face which separates a portion of a pair of adjacent raceway turns into ball path portions and non-ball path portions external to the ball path portions is disclosed in U.S. Pat. No. 5,622,082, which is owned by the assignee of the present application.

Previously, many crossover return buttons or blocks have been fitted into a cutout hole having generally radially straight sides with a press fit. When this method of installation of the button or block is utilized, the bore of the ball nut must be fitted with a pin of a specified diameter to provide "location" for the bottom surface of the button. After the button is pressed in, the locating pin needs to be removed.

Another method is to use the same procedure in a case where the button or block is a slip fit, and then provide an adhesive to retain the crossover in position.

Still, another method involves the use of a stepped cutout or opening and wherein the crossover is inserted into the cutout from the interior of the nut to enable the step to locate the button so the ball threads align with the ball passageways in the crossover. This prevents loading of the balls from the exterior of the nut, of course.

Other types of crossover devices involve buttons which are fitted into the cutout from the interior of the bore and are held in place by small ears that fit into recesses in the bore. As in the case of the provision of the stepped bores, such ball nut and screw assemblies cannot be externally loaded.

SUMMARY OF THE INVENTION

The present invention relates to ball nut and screw assemblies that provide a construction which permits loading of the balls from the exterior of the ball nut and an automated assembly of the ball nut and screw assembly.

One of the prime objects of the present invention is to provide an improved crossover construction wherein the simple act of insertion of the crossover properly locates the crossover ball passageway or passageways to properly align with the raceway threads and thereby facilitates ease of assembly, accuracy in locating and, very importantly, ball circuit loading from the outside or exterior of the ball nut.

Another object of the invention is to provide an improved crossover button for ball nut and screw assemblies that will snap into an accurately located position when loaded rapidly by automatic assembly equipment.

Another object of the invention is to design an improved crossover construction which is locked in place by the mere act of externally inserting it, after the balls have been loaded to the circuit.

Another further object of the invention is to obviate the necessity of loading the balls from the end of the nut which is a much more time consuming process.

Still, a further object of the invention is to provide an improved crossover method of assembly for ball and screw nut assemblies which is highly reliable and efficient in operation and does not add frictional considerations to the operation of the ball screw and nut assembly.

Still, another object of the invention is to provide a durable crossover mechanism of the character described which can be very economically manufactured and assembled and so enables the ball screw and nut assembly to be very economically marketed.

THE DRAWINGS

The presently preferred embodiment of the invention is disclosed in the following description and in the accompanying drawings, wherein:

FIG. 1 is a transverse sectional elevational view illustrating a prior art construct FIG. 2 is a similar view illustrating another prior art construction;

FIG. 3 is a similar transverse sectional exploded view illustrating the present invention with the crossover button shown above the ball nut opening ready for insertion;

FIG. 4 is an exterior side elevational view of the nut only;

FIG. 5 is a similar view showing the crossover inserted, the balls being omitted from the view in the interest of clarity;

FIG. 6 is an underplan view of a modified crossover button illustrating multiple ball passage crossways which may be employed;

FIG. 7 is a schematic plan view of a ball nut and screw assembly with two circuits of balls shown;

FIG. 8 is a schematic transverse sectional view thereof; and

FIG. 9 is a plan view of the nut only.

THE PRIOR ART DRAWINGS

It is to be understood that FIGS. 1 and 2 are included for the purpose of demonstrating prior constructions, which will be only briefly described sufficiently to provide an understanding of the concepts involved. These are schematic views which do not include some of the elements of the ball nut and screw assembly, such as, for example, the screw and the ball train.

In FIG. 1, the nut, generally designated 10, is provided with a helical thread 11. For purpose of illustration, the helical thread 11 may be considered to be a single lead land defining a nut groove 11a operating with a complemental screw helical groove to provide a raceway for a series of load bearing balls which provide a connection between the ball nut and the screw. Provided through the nut barrel or body is a radial cutout or opening 12, for a conventional crossover button or block, generally designated 13, which is shown above the nut 10 and ready for insertion. Not shown, is the pin which is conventionally secured within the bore 14 of the nut 10 to stop the bottom surface of the button or block B at the required level to obtain the necessary alignment with the turns of the helical raceway.

The crossover 13 is provided with a channel or ball passageway 13a of conventional type, such as, for example, shown in U.S. Pat. No. 3,580,098 and will not be more specifically described. When button or block 13 is a press fit in the opening 12, it is simply necessary to remove the locator pin from the nut interior. If the button is a slip fit, then, prior to removal of the pin, a suitable adhesive is used to retain the crossover button 13 in position.

In FIG. 2, the ball nut structure shown is the same and the same numerals have been used to identify the parts. It will be noted, however, that the cutout or opening 12 is of stepped configuration and includes a step or shoulder 15. With this construction, the pin, which previously was used as a locator device, need not be used and the step 15 locates the button or block B so that the ball turns line up with the ball passageways in the crossover. In this case, of course, the button or block 13 must be inserted from the inside of the nut.

Other crossover devices of which the applicant is aware are those disclosed in the following additional patents. It is to be understood that I incorporate all of the patents mentioned herein by reference.

U.S. Pat. No. 2,618,166—Douglas
U.S. Pat. No. 2,995,948—Galonska et al
U.S. Pat. No. 3,512,426—Dabrinhaus
U.S. Pat. No. 3,580,098—Goad
U.S. Pat. No. 3,185,435—Eschenbacher et al
U.S. Pat. No. 3,961,541—Fund et al
U.S. Pat. No. 4,148,226—Benton
U.S. Pat. No. 4,272,476—Wright et al
U.S. Pat. No. 4,905,534—Andonegui
U.S. Pat. No. 5,121,647—Teramachi
U.S. Pat. No. 5,193,409—Babinski The Present Constructions Referring now, more particularly, to FIGS. 3–8 wherein some of the same numbers have been used to designate similar parts for the sake of convenience only, and with attention in the first instance particularly to FIGS. 7 and 8, the ball nut and screw assembly, generally designated 16, is shown as having the screw, generally designated S, formed of a single start helical land 17 with land portions separated by a single start helical groove 18. The nut, generally designated N, is shown as having a complemental helical land 19 and groove 20. The nut groove portions 20 and screw groove portions 18 form a raceway R-1, which, in FIG. 7, includes portions of adjacent turns 21 and 22. Additionally, there is a second raceway R-2 provided in adjacent raceway turns 23 and 24. The balls in raceway R-1 are designated B-1 and the balls in raceway R-2 are designated B-2. In the case of raceway R-1, the ball circuit is comprised of a part of turn 21 and a part of turn 20, with these partial turns being connected by a ball circuit passageway 26, in the undersurface 25 of block 13. Raceway R-2 is comprised of a part of turn 23 and a part of turn 24 with the two turn parts connected by a second passageway 26a provided in the undersurface 25 of the block 13.

In FIG. 8, I have disclosed the passageway 26 as a crossover passage or channel which has a deepened mediate or central portion as shown to permit the balls to travel from one turn 23 up and over the intervening screw land 17 to the other turn 24. The crossover channel 26a is identical and operates in the same way. As is usual, the block 13 side walls 28, through which the channels or passageways 26 and 26a extend, project downwardly into the raceways R-1 and R-2 and function to guide the balls B-1 and B-2 into one end of the passages 26 and 26a and out the other.

Thus far, which has been described, is conventional and what is considered novel is the provision of snap-in recesses or grooves 30 in the generally axially extending, otherwise radially planar margined side wall portions 31 of the cutout or passage 12 provided radially in the nut barrel or body 10.

The grooves 30 provide radially inner and outer laterally projecting marginal wall portions 30a and 30b respectively. These axially elongate recesses 30 are provided at a predetermined distance inwardly from the external peripheral surface 10a of the nut body 10. Additionally, generally elliptical recesses 32 may be provided in the end walls 33 of the cutout opening 12 at, again, a predetermined distance inwardly from the exterior surface or of the nut body 10. The grooves 32 also provide radially inner and outer laterally projecting marginal wall portions 32a and 32b. The recesses 30 and 32 will be provided at exactly the same predetermined distance inwardly from the exterior surface 10a of nut body 10 and, as will become clear, serve to precisely locate the block or button 13 in exact position.

It is to be observed that the upper end of the block or button 13 is provided with a rectangular recess or well 34, which defines resilient deformable side and end walls 35 and 36, respectively, in the preferably synthetic plastic block or button 13. It is to be understood that the crossovers are made of very durable synthetic plastics, such as "Nylon" or "Delrin", or other suitable polymers.

Provided on each of the side walls 35 and end walls 36 of the button 13 are opposed button ribs or projections 37 and 38 of complemental configuration to recesses 30 and 32, respectively, which are provided in radial position to snap into the recesses 30 and 32, respectively, when the button or block 13 is inserted into the cutout opening 12 from the exterior of the nut N.

In FIG. 6, I have shown a block or button 13 wherein a trio of crossover passages 26, 26a, and 26b are shown, rather than a pair, as FIGS. 7 and 8 contemplate. In this version, the side ribs 37 are elongate and no end ribs 38 are employed.

It will be observed from a review of FIG. 3, which is an exploded view, that when pressed into the ball nut port or cutout 12, the crossover block 13 snap-locks into the recesses or grooves 30 and 32 simultaneously and is accurately located in position by them, centered along the axis plane BB (FIGS. 3 and 4). The well 34, following insertion of the button 13, may be filled with an epoxy or similar synthetic plastic C to lock the button 13 permanently in place.

The Operation

In manufacturing the assembly shown in FIGS. 7 and 8, the crossover block or button 13 is provided with the appropriate passageways 26 and 26a and the ribs 32 and 34, and the nut body 10 is provided with the appropriate closely fitting recesses 30 and 32 in its cutout opening 12 in the predetermined location. With the nut N in position, threaded on the screw S, the balls B-1 and B-2 can then be loaded through the appropriate opening 12 to the raceways R-1 and R-2. When the block 13 is pressed into position, the block side and end walls 34 and 36 of the upper portion of the block 13 collapse inwardly sufficiently to allow block insertion into the opening 12. When the crossover 13 is in the correct position, the walls 35 and 36 spring back to locate the ribs 37 and 38 within the recesses 30 and 32 provided for them, and lock them into place. With the ball nut and screw assembly taking place from outside, an automated assembly can be accomplished. The ball nut and screw assembly drive mechanism operates in the usual manner.

It is to be understood that other embodiments of the invention which accomplish the same function are incorporated herein with the scope of the appended patent claims.

I claim:

1. In a ball nut and screw system:
   a. a tubular ball nut having exterior and interior surfaces and a helical groove with turns on its said interior surface;
   b. a ball screw formed to provide, with said nut, a helical raceway;
   c. load bearing balls for said raceway disposed to occupy portions of said turns;
   d. said nut having a passage with radially outer and inner ends extending through said nut from said exterior surface thereof to said interior surface thereof to permit said balls to be fed into a ball-occupied portion of said turns through said passage;
   e. a snap-in crossover button, having an underface, disposed in said nut passage and providing an axially diagonal, ball return channel in its said underface for channeling said balls from one portion of one of said turns over an intervening land surface on the screw to a portion of another turn to recirculate them;
   f. said nut passage and snap-in button comprising a laterally compressible system, with a recess having a radially outer marginal lateral wall spaced radially inwardly of said radially outer end of said passage and a snap-in projection received in said recess radially inwardly of said marginal lateral wall, operable automatically upon insertion of said button to a predetermined position to locate said button radially in a position in which said crossover channel aligns helically with portions of said turns to furnish a passage over said intervening land surface of the screw.

2. The ball screw and nut assembly of claim 1 wherein said recess has a radially inner marginal wall and said snap-in projection engages both said inner and outer marginal walls of said recess.

3. The assembly of claim 1 wherein the radially outer end of said button, radially outward of said ball crossover passage, is deformable to snap into said recess.

4. The assembly of claim 3 wherein said radially outer end of said button is formed with at least one laterally deformable side wall having a projection thereon shaped to the configuration of said recess and received therein.

5. The assembly of claim 4 wherein said radially outer end of the button is hollowed to permit lateral inward deformation of said side wall upon radial insertion of said button.

6. The assembly of claim 3 wherein said button is a block having a radially inner portion providing said underface and a radially outer portion having opposing side walls with lateral projections thereon bounding a hollowed portion permitting lateral inward deformation of said button side walls upon insertion of said button.

7. The assembly of claim 6 wherein said button is rectangular in shape and has multiple crossover channels in its radially inner portion to align with pairs of turns of said nut groove, said hollowed portion comprising a rectangular recess with an open radially outer end providing resilient side walls and said projections being provided on all side walls of the radially outer portion of the button, said nut passage having recesses between its radially inner and outer ends in which all said projections are received.

8. The assembly of claim 2 wherein said laterally compressible system includes snap-in lateral projections on said button and conforming recesses in the marginal walls of said nut passage receiving them.

9. A method of constructing a ball nut and screw system having a tubular ball nut with an internal helical groove having turns, a ball screw having a complemental helical groove with an adjoining land formed to provide, with said nut, a helical raceway, load bearing balls for said raceway disposed to occupy portions of said turns, the nut having a passage with radially outer and inner ends extending through said nut generally radially from the exterior thereof to the interior thereof to permit balls to be fed into a ball-occupied portion of said turns through said passage; and a compressible snap-in crossover, sized for compressed insertion into said passage, and having an underface providing an axially diagonal, arched ball return passage for channeling said balls from one portion of one of said turns over an intervening land surface on the screw to a portion of another turn to recirculate them, said nut passage having at least one lateral recess therein with a radially outer lateral wall spaced radially inwardly from said outer end of said nut passage and said crossover being laterally compressible and having a lock part received in said recess;

the steps of:
   (1) assembling the nut on the screw;
   (2) feeding said balls from the exterior of the nut through said nut passage into said raceway;
   (3) compressing said crossover laterally and inserting it into said nut passage in a compressed state; and
   (4) moving said compressed crossover generally radially inwardly in said nut passage and permitting said crossover to expand laterally to cause said lock part to move laterally to a position in which it snaps into the said recess in the nut passage.

10. The method of claim 9 wherein said crossover has a laterally deformable side wall and said part projects laterally therefrom, and wherein the step of compressing said crossover comprises laterally compressing said side wall which is laterally compressed when said crossover is inserted.

11. The method of claim 10 wherein said crossover is provided as a button having a well in its radially outer wall bounded by resilient side walls which are thereby laterally deformable inwardly, said side walls having laterally exterior projections thereon and said passage having location recesses in which said projections are received; the step of compressing being accomplished by laterally inwardly deforming said side walls into said well.

* * * * *